(12) United States Patent
Yamada

(10) Patent No.: US 9,019,571 B2
(45) Date of Patent: Apr. 28, 2015

(54) IMAGE READING DEVICE

(75) Inventor: Akihiro Yamada, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 572 days.

(21) Appl. No.: 13/248,577

(22) Filed: Sep. 29, 2011

(65) Prior Publication Data
US 2012/0081762 A1 Apr. 5, 2012

(30) Foreign Application Priority Data

Sep. 30, 2010 (JP) ................................. 2010-220566

(51) Int. Cl.
H04N 1/04 (2006.01)
H04N 1/00 (2006.01)
H04N 1/40 (2006.01)
H04N 1/21 (2006.01)

(52) U.S. Cl.
CPC .... *H04N 1/00408* (2013.01); *H04N 2201/0048* (2013.01); *H04N 1/00488* (2013.01); *H04N 1/2158* (2013.01); *H04N 2201/0036* (2013.01); *H04N 2201/0094* (2013.01); *H04N 2201/0087* (2013.01)

(58) Field of Classification Search
CPC . H04N 1/193; H04N 1/1013; H04N 1/02815; H04N 1/0316; H04N 1/1017; H04N 1/32363; H04N 1/32379; H04N 2201/3298; H04N 1/32368; H04N 1/32448
See application file for complete search history.

(56) References Cited

U.S. PATENT DOCUMENTS

| 6,992,799 | B1 * | 1/2006 | Chen | 358/442 |
| 7,327,483 | B2 * | 2/2008 | Morisaki | 358/1.15 |
| 7,375,861 | B2 * | 5/2008 | Lebo et al. | 358/474 |
| 7,417,751 | B2 * | 8/2008 | Jia et al. | 358/1.13 |
| 8,023,136 | B2 * | 9/2011 | Dugas | 358/1.15 |
| 8,351,091 | B2 * | 1/2013 | Kojima | 358/474 |
| 2007/0013562 | A1 * | 1/2007 | Nagasawa | 341/50 |
| 2008/0130060 | A1 * | 6/2008 | Gotou et al. | 358/402 |
| 2008/0297849 | A1 * | 12/2008 | Fukasawa | 358/1.16 |
| 2010/0078882 | A1 * | 4/2010 | Kusama | 271/258.05 |
| 2010/0110494 | A1 * | 5/2010 | Park et al. | 358/1.16 |
| 2010/0167651 | A1 * | 7/2010 | Sakuda et al. | 455/41.2 |
| 2012/0081724 | A1 * | 4/2012 | Tagaki et al. | 358/1.9 |

(Continued)

FOREIGN PATENT DOCUMENTS

| JP | 2002-218134 A | 8/2002 |
| JP | 2003298798 A | * 10/2003 |

(Continued)

OTHER PUBLICATIONS

Notification of Reasons for Rejection (Office Action) dated Jan. 8, 2013 received in related Japanese patent application No. 2010-220566 with partial English Translation.

*Primary Examiner* — Cheukfan Lee
(74) *Attorney, Agent, or Firm* — Scully, Scott, Murphy & Presser, P.C.

(57) ABSTRACT

A reading device comprising a connection unit configured to be connected with a storage medium, a determination unit configured to determine whether or not the storage medium is connected to the connection unit, a judging unit configured to judge if there is a document to be read by a reading unit and an execution unit configured to execute the advising process when the judgment unit judges that there is the document to be read and the determination unit determines that the storage medium is connected to the connection unit.

7 Claims, 13 Drawing Sheets

(56) References Cited

U.S. PATENT DOCUMENTS

2012/0216250 A1* 8/2012 Chigusa .......................... 726/2
2013/0057920 A1* 3/2013 Nagata ........................ 358/1.16
2013/0286421 A1* 10/2013 Yamada ...................... 358/1.13

FOREIGN PATENT DOCUMENTS

| | | |
|---|---|---|
| JP | 2004-280417 A | 10/2004 |
| JP | 2006-110941 A | 4/2006 |
| JP | 2007-083504 A | 4/2007 |

* cited by examiner

FIG. 7

PLEASE REMOVE DOCUMENTS
BEFORE DISCONNECTING USB MEMORY

IMAGE READING DEVICE

CROSS REFERENCE TO RELATED APPLICATION

This application claims priority from Japanese Patent Applications No. 2010-220566 filed on Sep. 30, 2010. The entire content of each of these priority applications is incorporated herein by reference.

TECHNICAL FIELD

The present invention relates to a multifunction device.

BACKGROUND OF THE INVENTION

1. Field of the Invention

The invention relates to a reading device that reads an image of a document.

2. Description of the Related Art

In the related art, an image processing device is known which has a scanner mode in which a document is read by means of a reading unit to generate image data and the image data is written into a storage medium.

However, in the scanner mode (when image data is generated from a document by means of the reading unit and written into the storage medium), since the purpose is to write the image data into the storage medium, the user pays attention to taking the storage medium into which the image data has been written, and hence may forget to take the document from the reading unit.

SUMMARY OF THE INVENTION

Accordingly, it is an object of the invention to provide a technique to, in a scanner mode, prevent from forgetting to take a document when removing the storage medium.

To attain the object, a reading device according to an aspect of the invention includes: a connection unit configured to be connected with a storage medium, a determination unit configured to determine whether or not the storage medium is connected to the connection unit, a judging unit configured to judge if there is a document to be read by a reading unit and an execution unit configured to execute the advising process when the judgment unit judges that there is the document to be read and the determination unit determines that the storage medium is connected to the connection unit. The advising process can include a display of a message or a warning sound. Additionally, the storage medium can be locked to prevent disconnection when a document to be read includes security information.

Also disclosed is a reading device comprising a connection unit configured to be connected to a storage medium, a determination unit configured to determine whether or not the storage medium is connected to the connection unit, an identification unit configured to identify whether image data of the document read by the reading unit includes security information and a restricting unit configured to restrict the disconnection of the storage medium from the connection unit when the identification unit identifies that the document read by the reading unit includes security information.

According to the thus configured reading device, the user is likely to become aware of forgetting to take a document, and can be prevented from forgetting to take a document.

BRIEF DESCRIPTION OF THE DRAWINGS

FIG. 7 is an example of a message for reminding to take documents, which message is displayed on a display unit;

DESCRIPTION OF THE PREFERRED EMBODIMENTS (First Embodiment)

Figure 1:
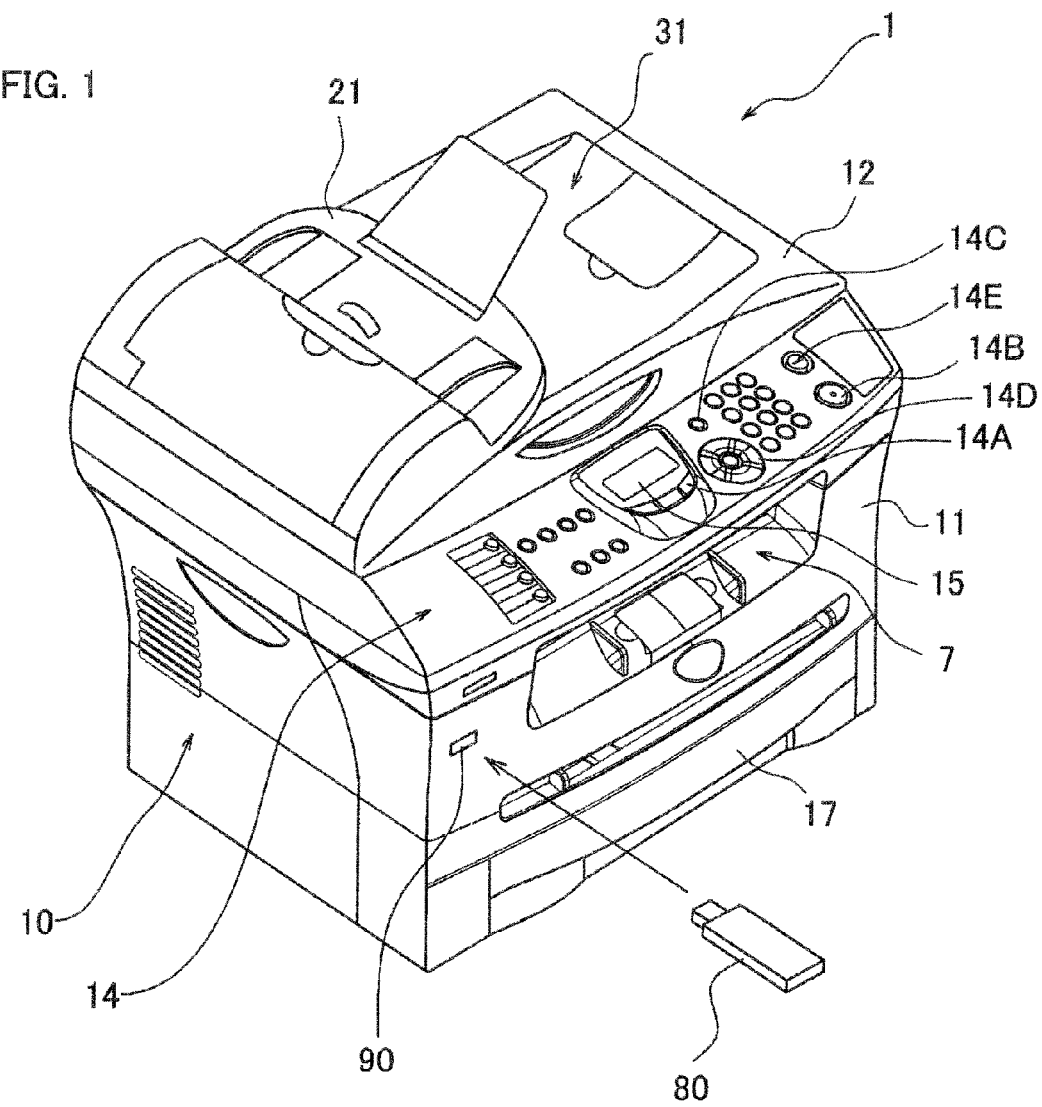
FIG. 1 is an external perspective view of a multi function device according to an embodiment of the invention.
Figure 2:
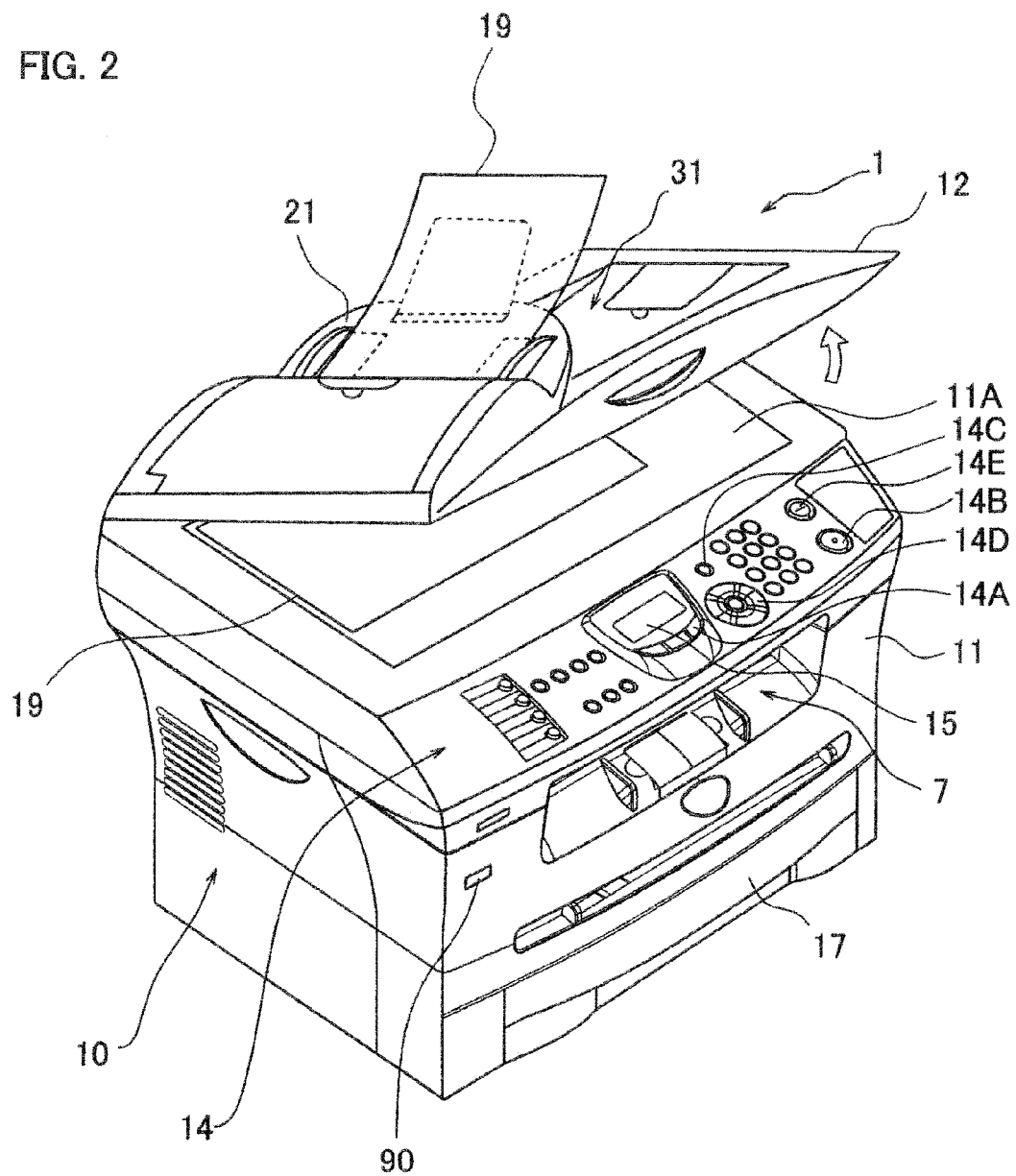
FIG. 2 is an external perspective view of the multi function device in a state where its document holder is opened.

FIGS. 1 and 2 are external perspective views of a multi function device 1.

FIG. 1 is an external perspective view of the multi function device 1 in a state where a document holder 12 provided in the multi function device 1 is closed (an example of a closed state according to the aspect of the invention).

FIG. 2 is an external perspective view of the multi function device 1 in a state where the document holder 12 (an example of a cover unit according to the aspect of the invention) provided in the multi function device 1 is opened (an example of an opened state according to the aspect of the invention).

It should be noted that the multi function device 1 has at least functions as an image scanner, a printer, a copier, and a facsimile machine.

The multi function device 1 includes a sheet tray 17 for storing sheets that are used for forming (hereinafter, may be referred to printing) images thereon, a main body 10 for forming an image on a sheet supplied from the sheet tray 17, and a document holder 12 (an example of a cover unit according to the aspect of the invention) that is supported by the main body 10 so as to entirely cover an upper surface of the main body 10 and so as to be openable and closeable.

Figure 3:
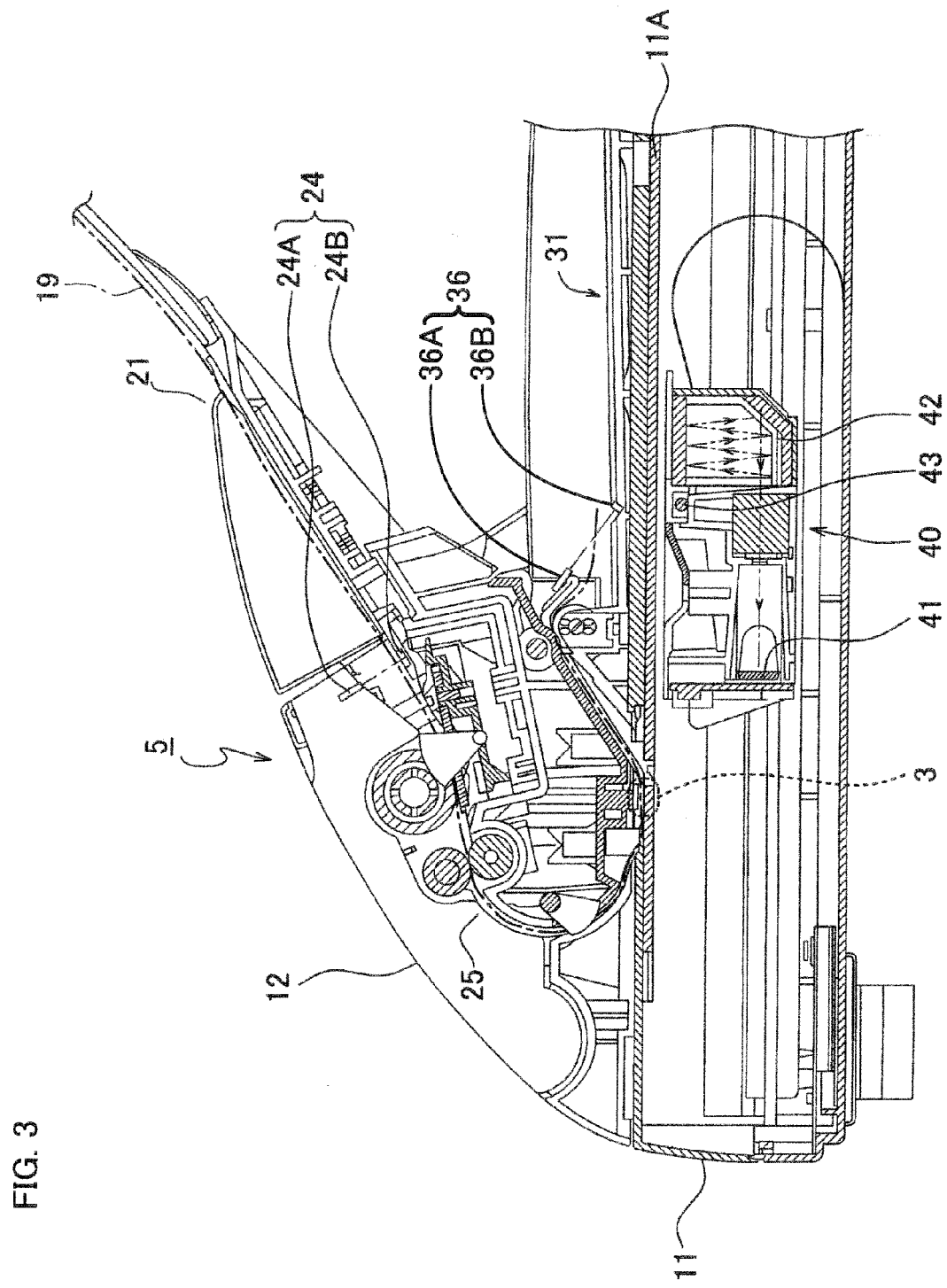
FIG. 3 is a cross-sectional view illustrating configurations of the document holder and a document reading unit of the multi function device.
Figure 4:
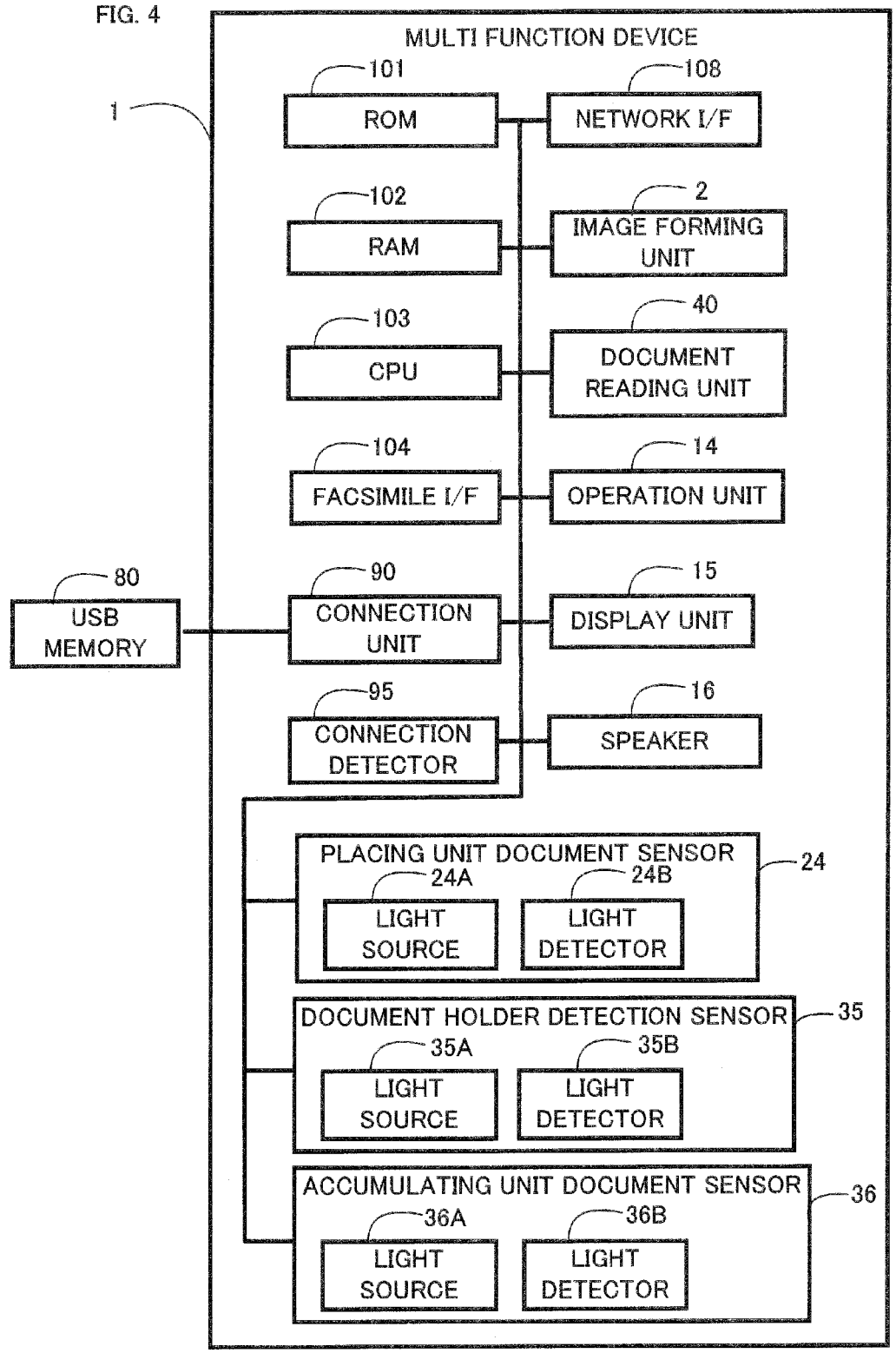
FIG. 4 is a block diagram illustrating an electrical configuration of the multi function device.

The main body 10 includes a document reading unit 40 (an example of a reading unit according to the aspect of the invention; see FIG. 3) for reading an image on a document 19 (see FIG. 2) (hereinafter, may be referred to as reading the document 19), an image forming unit 2 for forming an image on a sheet as shown in FIG. 4, and an operation unit 14 (also shown in FIG. 4) on which a user performs an input when using the multi function device 1. The document reading unit 40 and the image forming unit 2 are accommodated in a main body case 11.

The image forming unit 2 forms an image on a recording sheet by a known electrophotographic process on the basis of an image signal optically read by the document reading unit 40 or electronic data taken from an external device such as a PC.

The main body case 11 includes a reading surface 11A (see FIG. 2) on which a document 19 to be read by the document reading unit 40 is placed, and a sheet discharge unit 7 to which a sheet printed by the image forming unit 2 is discharged.

The reading surface 11A is a plate member formed from a material that allows light to pass therethrough, such as glass, and is fixed to the upper surface of the main body case 11 that faces the document holder 12.

The operation unit 14 includes an operation selection key 14A for selecting a function desired by the user, among a plurality of functions, a start key 14B for executing a function selected by the user, a display unit 15 (an example of a display unit according to the aspect of the invention) for displaying a state of the multi function device 1, a message, and the like, a menu key 14C for displaying a menu on the display unit 15, a cross key 14D for operating the menu, and a cancel key 14E for canceling various operations.

The operation selection key 14A is used for selecting a function that the user desires to use, from among each function provided in the multi function device 1. Specifically, a copy key for selecting a copy function, a facsimile key for selecting a facsimile function, a scanner key for selecting a scanner function, and the like are provided. When a function desired by the user is selected by the user operating the operation selection key, a screen and role assignment to keys, and the like, corresponding to the selected function are performed, whereby an operating environment provided by the operation unit 14 is switched.

FIG. 3 is a schematic cross-sectional view illustrating configurations of the document holder 12 and the document reading unit 40. As shown in FIG. 3, the document holder 12 includes an automatic document feeder 5 (hereinafter, also referred to as ADF).

The automatic document feeder 5 includes a placing unit 21 (an example of a placing unit according to the aspect of the invention) on which documents 19 to be read by the document reading unit 40 are placed, an accumulating unit 31 in which documents 19 read by the document reading unit 40 are accumulated, and a transfer unit 25 for transferring a document 19 from the placing unit 21 to the accumulating unit 31 via the reading surface 11A where the document 19 is read by the document reading unit 40 held at an automatic document feeding/reading position 3.

As shown in FIG. 3, the document reading unit 40 includes a light source 43 for applying light to a document 19, an optical element group 42 including a mirror, a lens, and the like for converging light reflected by the document 19, and an image sensor 41 for reading an image from the document 19. In other words, the document reading unit 40 is configured to apply light from the light source 43 to the document 19, converge light reflected by the document 19, by the optical element group 42, and read the document 19 by sensing the converged reflected light by the image sensor 41.

Further, the document reading unit 40 is configured to be capable of reading a document 19 at a position facing the automatic document feeding/reading position 3, and to be movable in the longitudinal direction of the main body case 11 (in the right-left direction in FIG. 3) along the reading surface 11A by a document reading unit drive mechanism which is not shown.

In other words, when reading a document 19 by using the automatic document feeder 5, the document reading unit 40 is held at the position facing the automatic document feeding/reading position 3, and reads the entire image on the document 19 that is transferred by the automatic document feeder 5. When reading a document 19 located so as to cover the reading surface 11A (used as so-called flat bed scanner (hereinafter, also referred to as FB) type), the document reading unit 40 reads the entire image on the document 19 located on the reading surface 11A while being moved by the known document reading unit drive mechanism.

In the placing unit 21, a placing unit document sensor 24 (an example of a judgment unit according to the aspect of the invention) is located which detects that a document 19 is placed on the placing unit 21. The placing unit document sensor 24 is an optical sensor including a light source 24A and a light detector 24B. The light source 24A and the light detector 24B are located in facing relation to each other such that light traveling from the light source 24A toward the light detector 24B is blocked by the document 19 placed on the placing unit 21.

A document holder detection sensor 35 includes a light detector 35B located in the main body case 11 and at a position deviated from "a moving path on which the document reading unit 40 moves", and a light source 35A located in the document holder 12. The document holder detection sensor 35 is configured such that when the document holder 12 is in the closed state, the light detector 35B receives light emitted from the light source 35A.

In other words, when the light detector 35B does not receive the light emitted from the light source 35A, the document holder 12 is in the opened state, and when the light detector 35B receives the light emitted from the light source 35A, the document holder 12 is in the closed state.

In the accumulating unit 31, an accumulating unit document sensor 36 (an example of a detection unit according to the aspect of the invention) is located which detects that documents 19 are accumulated in the accumulating unit 31. The accumulating unit document sensor 36 is an optical sensor including a light source 36A and a light detector 36B. The light source 36A and the light detector 36B are located in facing relation to each other such that light traveling from the light source 36A toward the light detector 36B is blocked by the documents 19 placed on the accumulating unit 31.

(Electrical Configuration of Multi Function Device)

FIG. 4 is a block diagram illustrating an electrical configuration of the multi function device 1. The multi function device 1 includes a network interface (network I/F) 108 for connecting to an external device such as a personal computer or a network (not shown), a facsimile interface (facsimile I/F) 104 for connecting to a telephone line, a USB memory 80 (an example of a storage medium according to the aspect of the invention) that is a portable storage medium from and into which data is readable and writable, a connection unit 90 (an example of a connection unit according to the aspect of the invention) to and from which the USB memory 80 is connected and disconnected, a connection detector 95 for detecting that the USB memory 80 is connected to the connection unit 90, a ROM 101 for storing a processing program for controlling various drives of the multi function device 1, a RAM 102 as an example of a build-in storage medium for temporarily storing a processing result and the like, a CPU 103 (an example of a determination unit, an execution unit, and an identification unit according to the aspect of the invention) for executing the processing program stored in the ROM 101, and a speaker 16 (an example of a sound-output unit according to the aspect of the invention) for outputting a warning sound stored in the ROM 101, in accordance with the processing program.

The document reading unit 40, the image forming unit 2, the operation unit 14, the display unit 15, the placing unit document sensor 24, the document holder detection sensor 35, and the accumulating unit document sensor 36 are connected to each other.

The connection unit 90 is configured to supply power to the USB memory 80 when the USB memory 80 is connected to the connection unit 90, and includes the connection detector 95 for detecting that the USB memory 80 is connected. It should be noted that examples of data stored in the USB memory 80 includes files having universal image formats, such as JPEG and TIFF, document files such as data created by general word processor software and PDF format data, and data obtained by filing print data outputted by a printer driver.

(Remind-Of-Document Process)

Figure 5:
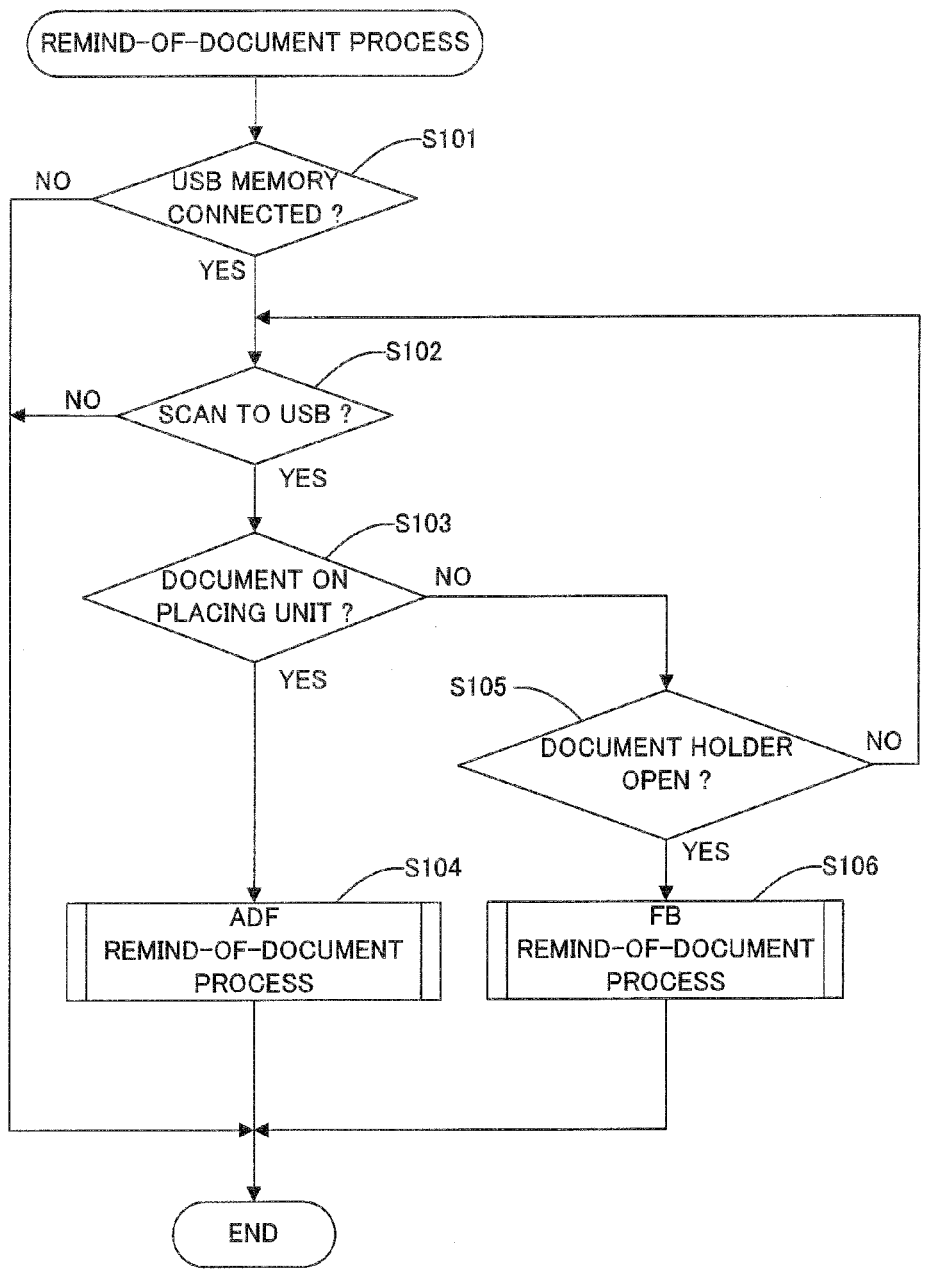
FIG. 5 is a flowchart illustrating a flow of a remind-of-document process according to an embodiment of the invention.

FIG. 5 is a flowchart illustrating a flow of a remind-of-document process according to the aspect of the invention. The remind-of-document process will be described with reference to FIG. 5. When the user selects the scanner function by the operation selection key 14A, the remind-of-document process is started by the CPU 103 reading out the processing program from the ROM 101.

First, the CPU 103 determines whether or not the USB memory 80 is connected to the connection unit 90 (S101). When determining that the USB memory 80 is connected to the connection unit 90 (S101: YES), the CPU 103 determines whether or not there is a request for "scan to USB" (S102). Here, "scan to USB" is a process of storing, in the USB memory 80, image data that is read from a document 19 by the document reading unit 40.

Specifically, when the user inserts the USB memory 80 into the connection unit 90, the CPU 103 detects that the USB memory 80 is connected to the connection unit 90, through the connection detector 95, and determines that the USB memory 80 is connected to the connection unit 90. In addition, when the user operates the menu key 14C and the cross key 14D to select "scan to USB" from the menu that is displayed on the display unit 15 and that includes a plurality of layers, the CPU 103 determines that there is a request for "scan to USB".

Next, when determining that "scan to USB" is requested (S102: YES), the CPU 103 determines whether or not any document 19 is placed on the placing unit 21, by the placing unit document sensor 24 (S103). When determining that any document 19 is placed on the placing unit 21 (S103: YES), the CPU 102 executes an ADF remind-of-document process (S104) and ends the remind-of-document process. The ADF remind-of-document process will be described in detail below.

On the other hand, when determining that no document 19 is placed on the placing unit 21 of the automatic document feeder 5 (S103: NO), the CPU 103 determines whether or not the document holder 12 has been once in the opened state as shown in FIG. 2, by the document holder detection sensor 35 (S105). When determining that the document holder 12 has been once in the opened state (S105: YES), the CPU 103 determines that a document 19 is placed on the reading surface 11A, executes an FB remind-of-document process described in detail below (S106), and ends the remind-of-document process.

When determining that "scan to USB" is requested (S102: YES), determining that no document is placed on the placing unit 21 of the automatic document feeder 5 (S103: NO), and determining that the document holder 12 has been kept in the closed state (S105: NO), the CPU 103 repeats the determinations at S103 and S105 until any document 19 is placed on the placing unit 21 (S103: YES) or it is determined that the document holder 12 is in the opened state (S105: YES).

When the USB memory 80 is not connected to the connection unit 90 (S101: NO) or when "scan to USB" is not requested (S102: NO), the CPU 103 ends the remind-of-document process. (First ADF remind-of-document process)

Figure 6:
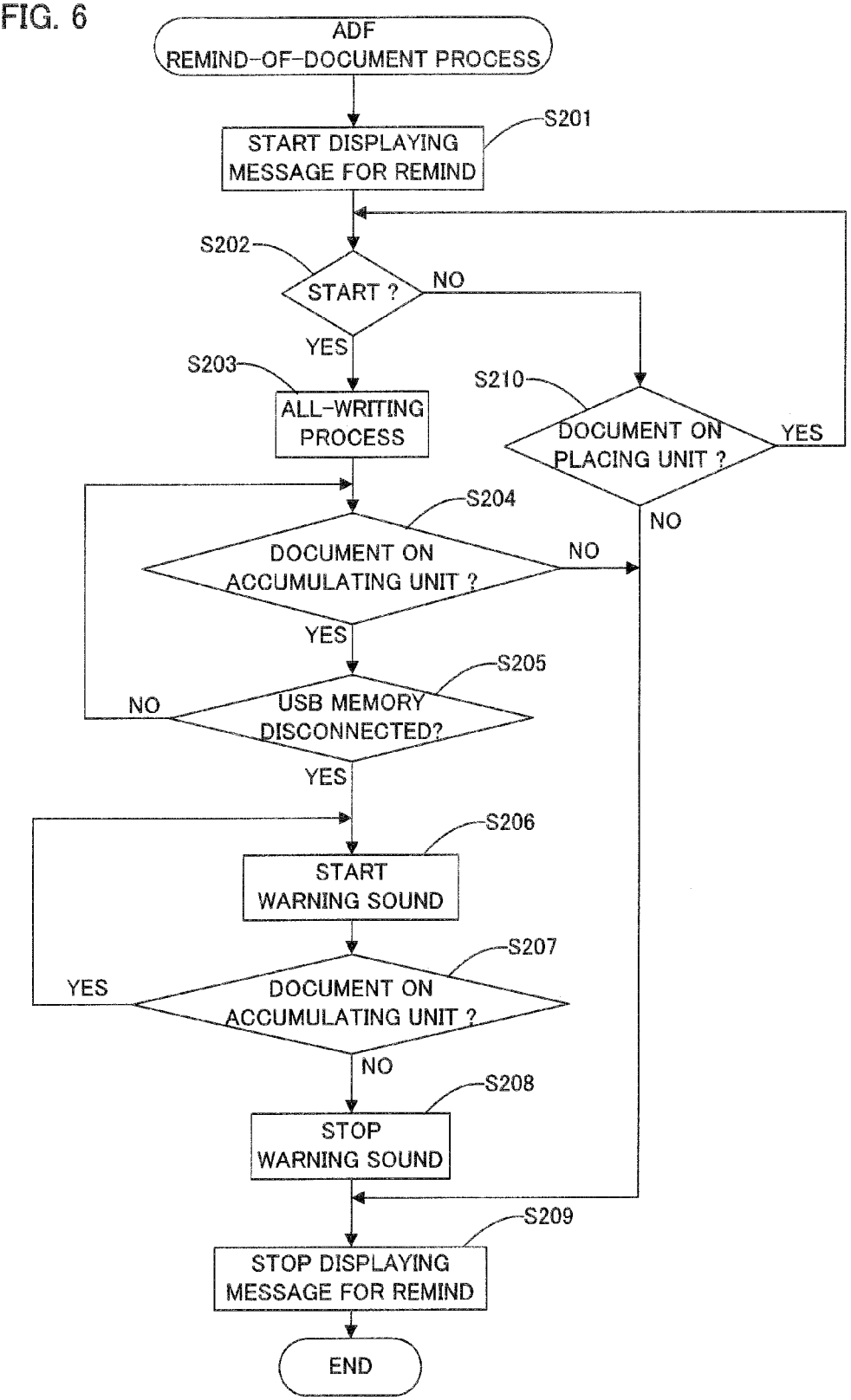
FIG. 6 is a flowchart illustrating a flow of a first ADF (automatic document feeder) remind-of-document process.

FIG. 6 is a flowchart illustrating a flow of a first ADF remind-of-document process. The first ADF remind-of-document process will be described with reference to FIGS. 6 and 7.

First, the CPU 103 displays a message, "please remove documents before removing USB memory" shown in FIG. 7, on the display unit 15 (an example of an advising process according to the aspect of the invention, S201), and determines whether or not there is a start instruction to instruct the document reading unit 40 to start reading a document 19 (S202). Specifically, when the user presses the start key 14B, the CPU 103 determines there is a start instruction.

Next, when determining that there is a start instruction (S202: YES), the CPU 103 executes an all-writing process of: causing the document reading unit 40 to read all documents 19 placed on the placing unit 21; and storing, in the USB memory 80, image data obtained by the reading of the document reading unit 40 (S203).

On the other hand, when determining that there is no start instruction (S202: NO), the CPU 103 determines whether or not any document 19 is placed on the placing unit 21 (S210). When determining that any document 19 is placed on the placing unit 21 (S210: YES), the CPU 103 returns to S202. The CPU 103 waits by repeating the determinations at S202 and S210 until determining that there is a start instruction (S202: YES) or determining that there is no document 19 on the placing unit 21 (S210: NO).

When determining that the document 19 on the placing unit 21 has been removed (S210: NO), the CPU 103 ends the display for reminding to take documents (S209) and ends the ADF remind-of-document process. Since the display of the message that is displayed at S201 is ended, the user is not misled by display of an unnecessary message, and the convenience is enhanced for the user.

Subsequently to S203, the CPU 103 determines whether or not there is any document 19 discharged to the accumulating unit 31, by the accumulating unit document sensor 36 (S204). When determining that there is any document 19 discharged to the accumulating unit 31 (S204: YES), the CPU 103 determines whether or not the USB memory 80 has been dismounted from the connection unit 90 (S205). When determining that the USB memory 80 has been dismounted from the connection unit 90 (S205: YES), the CPU 103 starts warning with the warning sound against forgetting to take the documents 19 in the accumulating unit 31 (an example of an advising process according to the aspect of the invention, S206).

Specifically, if the user dismounts the USB memory 80 from the connection unit 90 without removing the documents 19 in the accumulating unit 31, the user pays attention to taking away the USB memory 80 and hence tends to forget the documents 19 in the accumulating unit 31. Thus, when the user dismounts the USB memory 80 from the connection unit 90 without removing the documents 19 in the accumulating unit 31, since there is a high possibility that the user will forget the documents 19 in the accumulating unit 31, the user's attention is drawn to forgetting to take the documents 19 in the accumulating unit 31, by warning with the warning sound from the speaker 16 for reminding of taking the documents 19 (S206).

When determining that the USB memory 80 has not been dismounted from the connection unit 90 (S205: NO), the CPU 103 returns to S204 and performs monitoring so as to prevent the USB memory 80 from being dismounted from the connection unit 90 without removing the documents 19 discharged to the accumulating unit 31.

Subsequently to S206, the CPU 103 determines whether or not there is any document 19 discharged to the accumulating unit 31 (S207). When determining there is no document 19 discharged to the accumulating unit 31 (S207: NO), the CPU 103 stops the warning with the warning sound for reminding of taking the documents 19 discharged to the accumulating unit 31 (S208), stops the display for reminding to take documents (S209), and ends the ADF remind-of-document process. On the other hand, when determining that there is any document 19 discharged to the accumulating unit 31 (S207: YES), the CPU 103 continues to warn with the warning sound against forgetting to take the documents 19 in the accumulating unit 31, until determining that there is no document 19 discharged to the accumulating unit 31 (S207: NO).

When determining that the documents 19 discharged to the accumulating unit 31 have been removed (S204: NO), the CPU 103 stops the display for reminding to take documents (S209) and ends the ADF remind-of-document process. In other words, the display for reminding to take documents is for preventing the user from forgetting to take away the documents 19. When "scan to USB" is selected, the user tends to forget to take the documents 19 discharged to the accumulating unit 31, but if the documents 19 have been removed, there is no discharged document 19 in the accumulating unit 31 and thus the display for reminding to take documents may be ended.

(FB Remind-of-Document Process)

Figure 8:
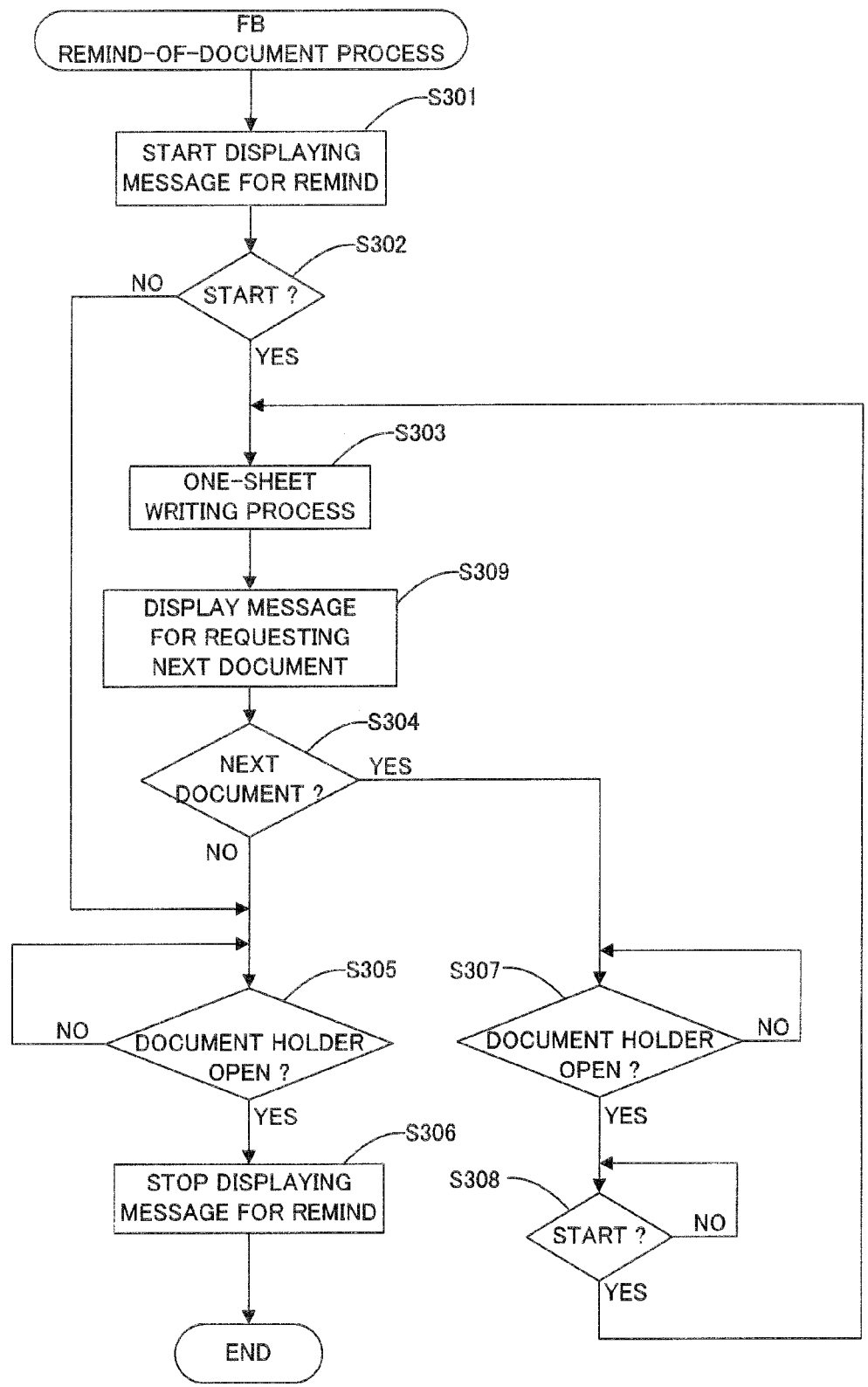
FIG. 8 is a flowchart illustrating a flow of a FB (flat bed scanner) remind-of-document process.

FIG. 8 is a flowchart illustrating a flow of the FB remind-of-document process. The FB remind-of-document process will be described with reference to FIGS. 8 and 9.

First, the CPU 103 displays the message, "please remove documents before removing USB memory", on the display unit 15 (S301), and determines whether or not there is a start instruction to instruct the document reading unit 40 to start reading a document 19 located on the reading surface 11A (S302). When determining that there is a start instruction (S302: YES), the CPU 103 executes a one-sheet writing process of: causing the document reading unit 40 to read one document 19 located on the reading surface 11A; and storing, in the USB memory 80, image data obtained by the reading of the document reading unit 40 (S303).

Next, the CPU 103 determines whether or not there is a request for causing the document reading unit 40 to read a next document 191 (S304). Specifically, the CPU 103 displays a message, "is there next document?", on the display unit 15. When there is a next document 191, if the user selects "YES", the CPU 103 determines that there is a request for causing the document reading unit 40 to read a next document 191 (S304: YES). On the other hand, when there is no next document 191, if the user selects "NO", the CPU 103 determines that there is no request for causing the document reading unit 40 to read a next document 191 (S304: NO).

When determining that there is no request for causing the document reading unit 40 to read a next document 191 (S304: NO), the CPU 103 determines whether or not the document holder 12 is in the opened state, by the document holder detection sensor 35 (S305). Subsequently, when determining that the document holder 12 is in the opened state (S305: YES), the CPU 103 stops the display of the message that is displayed at S301 (S306), and ends the FB remind-of-document process.

Specifically, when the user opens the document holder 12 after causing the document reading unit 40 to read a document 19, there is a high possibility that the user has opened the document holder 12 for removing the document 19 from the reading surface 11A. Thus, when the display of the message is ended, an unnecessary message display does not have to be continuously performed.

On the other hand, when determining that the document holder 12 is in the closed state (S305: NO), the CPU 103 remains at S305 until an open state is determined However, until the document holder 12 is opened, there is a high possibility that the document 19 remains on the reading surface 11A. Thus, the CPU 103 waits until determining that the document holder 12 is in the opened state (S305: YES).

Figure 9:
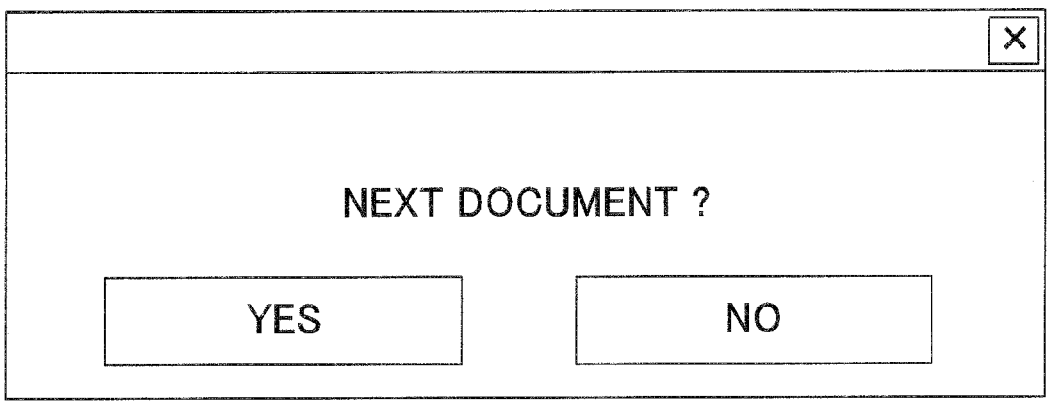
FIG. 9 is an example of a message for confirming presence/absence of a next document, which message is displayed on the display unit.

When, at S304, there is a request for causing the document reading unit 40 to read a next document 191 (S304: YES), the CPU 103 determines whether or not the document holder 12 is in the opened state (S307). FIG. 9 illustrates an example of a user prompt, which is displayed to prompt a user to request the document reading unit to read the next document 191. This prompt is displayed at S309. When determining that the document holder 12 is in the opened state (S307: YES), the CPU 103 regards a next document 191 as being placed on the reading surface 11A, and determines whether or not there is a start instruction to instruct the document reading unit 40 to start reading the next document 191 placed on the reading surface 11A (S308). When there is a start instruction to read the next document 191 (S308: YES), the CPU 103 returns to S303, and repeats S303 and S304 for all documents.

When determining that the document holder 12 is in the closed state (S307: NO), the CPU 103 waits until determining that the document holder 12 is in the opened state (S307: YES). When determining that there is no start instruction to read the next document 191 (S308: NO), the CPU 103 waits until there is a start instruction to read the next document 191 (S308: YES).

(Advantages of First Embodiment)

According to the reading device of the first embodiment of the invention, the placing unit document sensor 24 detects the presence of the documents 19 and the connection detector 95 detects that the USB memory 80 is connected to the connection unit 90, the CPU 103 advises removing the documents 19, by displaying the message, "please remove documents before removing USB memory" shown in FIG. 7, on the display unit 15. Thus, when dismounting the USB memory 80 from the connection unit 90, the user is likely to become aware of forgetting to take the documents 19, by the message displayed on the display unit 15, and can be prevented from forgetting to take the documents 19.

When the accumulating unit document sensor 36 detects the presence of the documents 19 and the connection detector 95 detects that the USB memory 80 is connected to the connection unit 90, if the USB memory 80 is dismounted from the connection unit 90, the CPU 103 advises removing the documents 19, by causing the speaker 16 to output the warning sound. Thus, the user is likely to become aware that the reason why the warning sound is outputted is that the documents 19 in the accumulating unit 31 have not been removed, and can be prevented from forgetting to take the documents 19.

When any document 19 is placed on the placing unit 21 and the USB memory 80 is connected to the connection unit 90, the CPU 103 displays the message, "please remove documents before removing USB memory" shown in FIG. 7, on the display unit 15. Thus, while the document 19 is present in the multi function device 1, the advising process is executed, and hence the convenience is enhanced for the user.

When the placing unit document sensor 24 detects absence of the document 19 on the placing unit 21 before the document reading unit 40 reads a document 19 after the advising process is executed, the CPU 103 stops the display of the message on the display unit 15. Thus, the display of the message on the display unit 15 is ended such that the message is prevented from being unnecessarily displayed on the display unit 15, and hence the convenience is enhanced for the user.

When the document holder 12 is in the opened state, the CPU 103 stops the display of the message on the display unit 15. Thus, when the CPU 103 regards the document 19 as being removed from the reading surface 11A, by the user opening the document holder 12, an unnecessary message is not displayed on the display unit 15, and hence the convenience is enhanced for the user.

(Second Embodiment)

Figure 10:
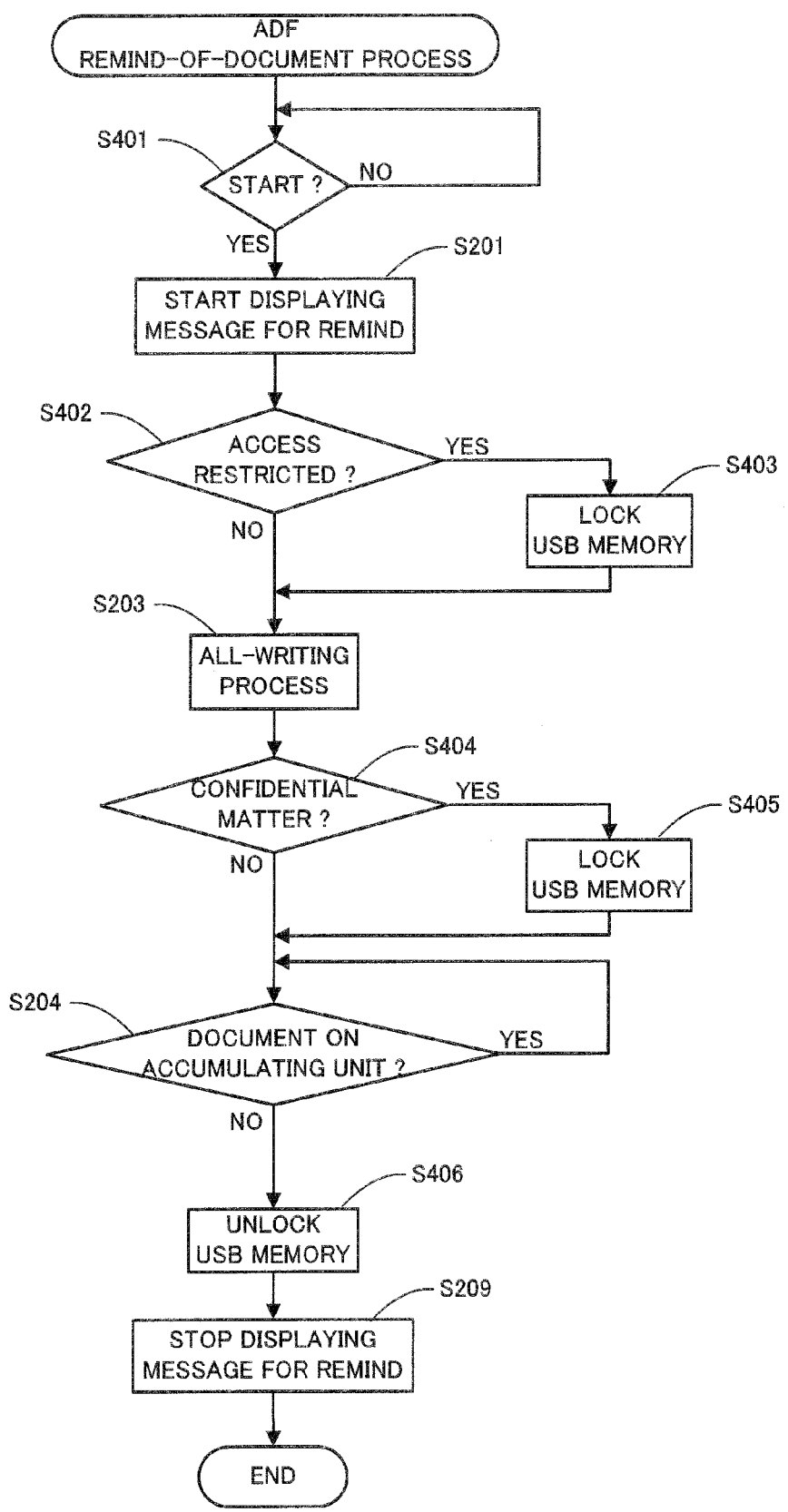
FIG. 10 is a flowchart illustrating a flow of a second ADF remind-of-document process.

FIG. 10 is a flowchart illustrating a flow of a second ADF remind-of-document process. The second ADF remind-of-document process will be described with reference to FIGS. 10 and 11. The same processes as those in the first ADF remind-of-document process are indicated by the same numerals, and the description thereof is omitted as appropriate.

First, the CPU 103 determines whether or not there is a start instruction to instruct the document reading unit 40 to start reading a document 19 (S401). When determining that there is a start instruction (S401: YES), the CPU 103 displays the message, "please remove documents before removing USB memory" shown in FIG. 7, on the display unit 15 (S201). On the other hand, when there is no start instruction (S401: NO), the CPU 103 repeats the determination at S401 until there is a start instruction.

Next, the CPU 103 determines whether or not addition of access restriction has been set to image data of the document 19 read by the document reading unit 40, for example, secure PDF has been set thereto (S402). Here, the secure PDF refers to a type of PDF in which when image data obtained by reading of the document reading unit 40 is converted into PDF and stored in the USB memory 80, authorities to view and print can be set, and a type of PDF in which a password is previously registered, and input of the registered password is requested when a PDF file is opened. Specifically, before providing a start instruction, the user performs setting of the secure PDF by operating the menu key 14C and making a selection from the menu that is displayed on the display unit 15 and that includes the plurality of layers.

When determining that the addition of access restriction has not been set to the image data of the document 19 read by the document reading unit 40 (S402: NO), the CPU 103 executes the all-writing process of: causing the document reading unit 40 to read all documents 19 placed on the placing unit 21; and storing, in the USB memory 80, image data obtained by the reading of the document reading unit 40 (S203).

On the other hand, when determining that the addition of access restriction has been set to the image data of the document 19 read by the document reading unit 40 (S402: YES), the CPU 103 locks the USB memory 80 (an example of an advising process according to the aspect of the invention, S403) and proceeds to S203. In other words, when there is any document 19 in the accumulating unit 31, the USB memory 80 is physically locked so that the USB memory 80 is prevented from being pulled out, and thus user's attention is drawn to forgetting to take the document 19 in the accumulating unit 31.

Figure 11:
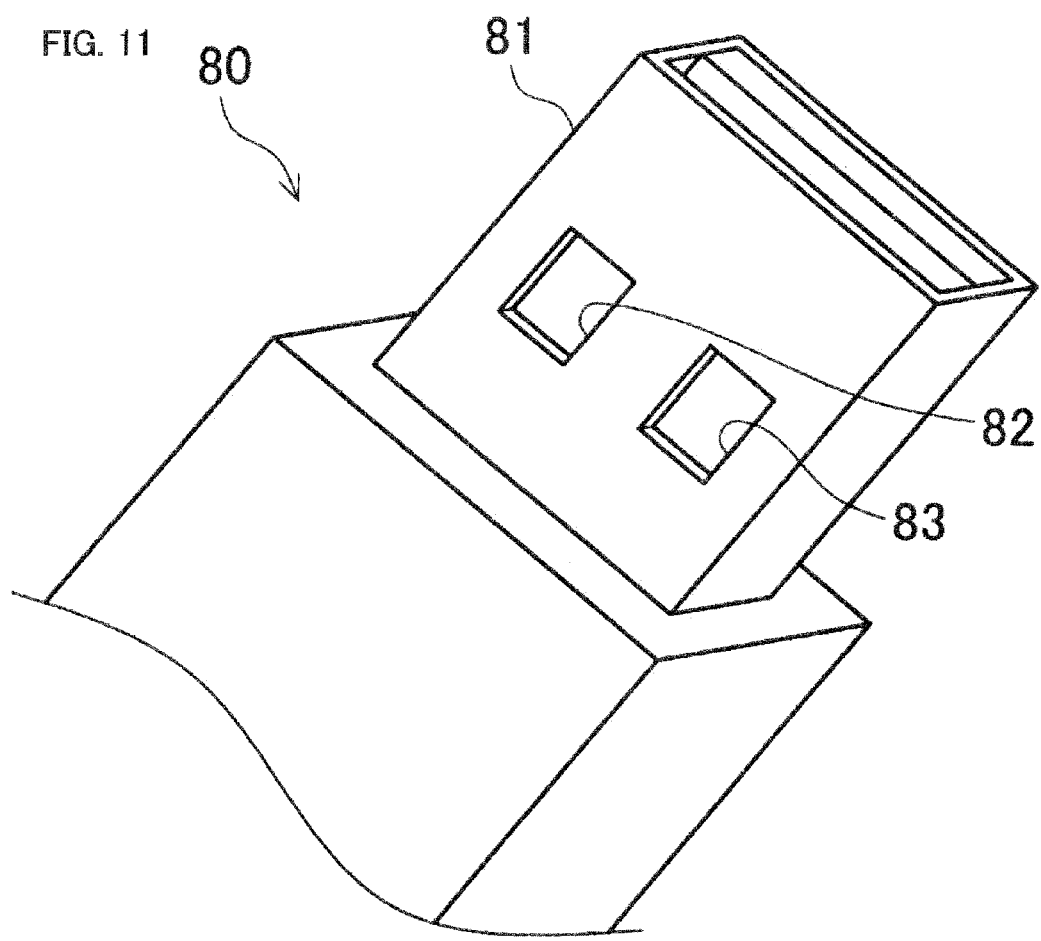
FIG. 11 is a perspective view illustrating a configuration of a connector unit of a USB memory.
Figure 12:
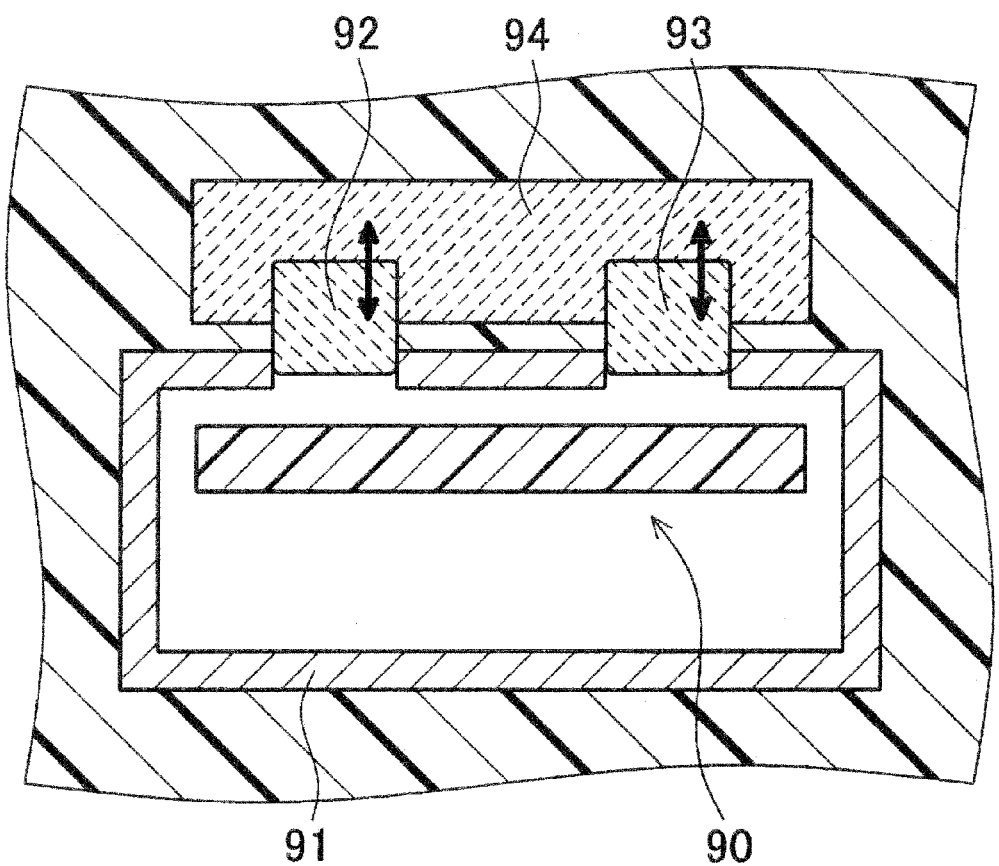
FIG. 12 is a cross-sectional view illustrating a configuration of a connector unit of the multi function device.
Figure 13:
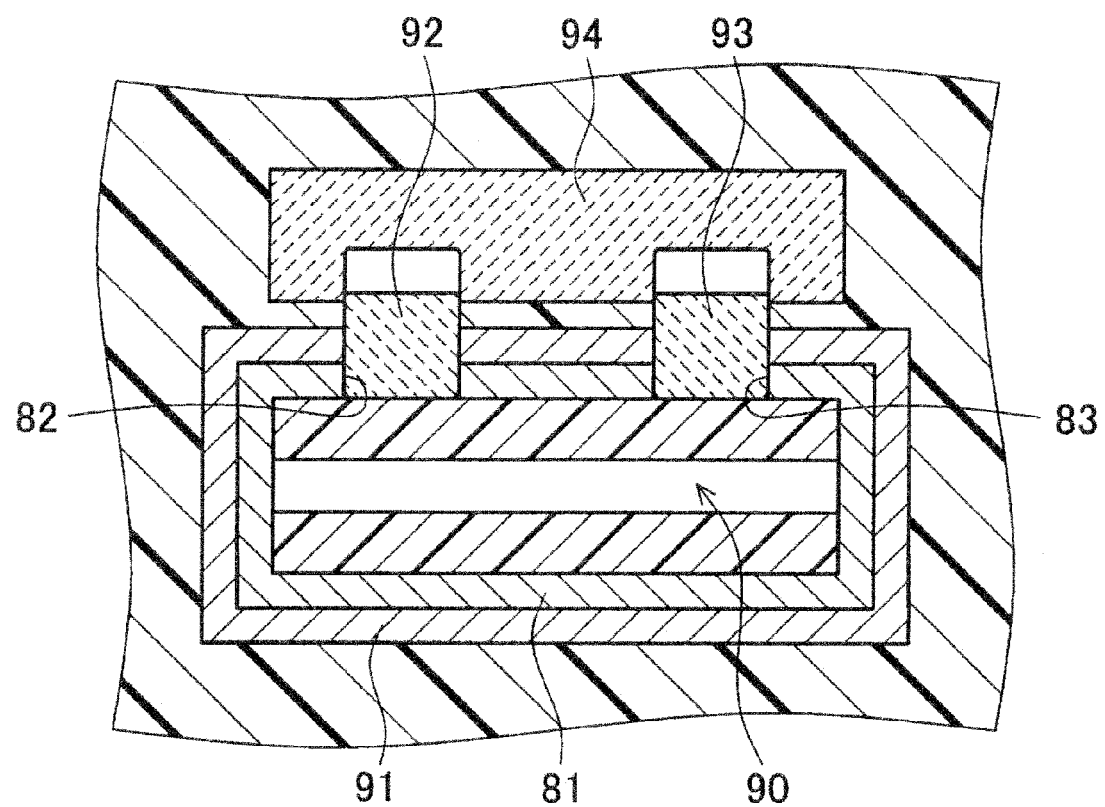
FIG. 13 is a cross-sectional view illustrating a state where the connector unit of the USB memory is connected to the connector unit of the multi function device.

An example of a mechanism of physically locking the USB memory is as follows. As shown in FIG. 11, a connector (series A) of the USB memory 80 is provided with two through holes 82 and 83 in a flat surface of a connector unit 81 having a rectangular cross section. Meanwhile, as shown in FIG. 12, a connector portion 91, bolts 92 and 93 (an example of a restriction unit according to the aspect of the invention) engageable with the through holes 82 and 83 of the USB memory 80, and a actuator 94 for actuating the bolts 92 and 93 are provided in a connection unit 90, for the USB memory 80, in the multi function device 1. The bolts 92 and 93 are movable in a direction in which the bolts 92 and 93 can be connected to and pulled out from the through holes 82 and 83. When the USB memory 80 is not mounted, the bolts 92 and 93 are hidden inside such that the bolts 92 and 93 are not located in the space surrounded by the connector portion 91. When the USB memory 80 is connected to the connection unit 90, the bolts 92 and 93 moves so as to engage with the through holes 82 and 83 as shown in FIG. 13, thereby fixing the connector unit 81 of the USB memory 80. Thus, the USB memory 80 is physically locked by the multi function device 1. It should be noted that this lock mechanism is merely one example and the invention is not limited thereto.

Next, the CPU 103 determines whether or not the image data of the document 19 read by the document reading unit 40 includes a mark indicating a confidential matter, for example, a pattern of a mark such as "secret" or "confidential information" (an example of a specific pattern according to the aspect of the invention) (S404). When determining that a mark indicating a confidential matter is not present in the document 19 (S404: NO), the CPU 103 proceeds to S204.

On the other hand, when determining that a mark indicating a confidential matter is present in the document 19 (S404: YES), the CPU 103 locks the USB memory 80 (S405) similarly to S403, and proceeds to S204.

At S204, the CPU 103 determines whether or not the document 19 in the accumulating unit 31 has been removed (S204). When determining that the document 19 in the accumulating unit 31 has been removed (S204: NO), the CPU 103 unlocks the USB memory 80 (S406). Specifically, the bolts 92 and 93 disengage from the through holes 82 and 83, whereby the USB memory 80 is unlocked. Subsequently, the CPU 103 stops the display for reminding to take the document 19 in the accumulating unit 31, which display is performed at S201 (S209), and ends the second ADF remind-of-document process.

When determining that the document 19 in the accumulating unit 31 has not been removed (S204: YES), the CPU 103 waits until the document 19 in the accumulating unit 31 is removed.

(Advantages of Second Embodiment)

According to the reading device of the second embodiment of the invention, when determining that the addition of access restriction has been set to the image data of the document 19 read by the document reading unit 40 or that the image data includes a specific pattern indicating a confidential matter such as "secret" or "confidential information", the CPU 103 performs the advising process for advising removing the document 19. Thus, the user is likely to become aware of forgetting to take the document 19 of which the image data has access restriction set thereto, or the document 19 having a mark such as "secret" or "confidential information", and can be prevented from forgetting to take the document 19.

Since the CPU 103 causes the bolts 92 and 93 to move so as to engage with the through holes 82 and 83 of the USB memory 80, thereby fixing the connector unit 81 of the USB memory 80 to the connection unit 90, the user is likely to become aware that the reason why the USB memory 80 is physically locked is that the document 19 has not been removed from the accumulating unit 31, and can be prevented from forgetting to take the document.

When the accumulating unit document sensor 36 detects that there is no document 19 after the bolts 92 and 93 move so as to engage with the through holes 82 and 83 of the USB memory 80 to fix the connector unit 81 of the USB memory 80 to the connection unit 90, the CPU 103 causes the bolts 92 and 93 to disengage from the through holes 82 and 83 of the USB memory 80. Thus, when the user has removed the document 19, the USB memory 80 is unlocked, and hence the convenience is enhanced for the user.

At least when reading of an important document 19 is performed such that access restriction is added to the image data of the document 19 read by the document reading unit 40 or when a document 19 includes a specific pattern indicating a confidential matter such as "secret" or "confidential information", the CPU 103 physically locks the USB memory 80. Thus, the user is likely to become aware of forgetting to take the important document 19 from which important information can leak out, and hence the convenience is enhanced for the user.

(Other Embodiments)

In the embodiments of the invention, the multi function device, in which an electrophotographic image forming device and a reading device are combined, has been described. However, the invention is not limited thereto, and is applicable to various image forming devices such as a copier, an ink-jet printer, an LED printer, a facsimile machine, a printing machine, and a multi function device in which another function is combined.

In the embodiments of the invention, the USB memory is used as a storage medium. However, according to another embodiment of the invention, another storage medium such as a memory card may be used.

In the first embodiment of the invention, as the advising process, the CPU 103 both warns with the warning sound against forgetting to take the document 19 in the accumulating unit 31, and displays the message, "please remove documents before removing USB memory", on the display unit 15. However, the CPU 103 may only warn with the warning sound against forgetting to take the document 19 in the accumulating unit 31, or display the message, "please remove documents before removing USB memory", on the display unit 15.

Further, a timing of warning with the warning sound against forgetting to take the document 19 in the accumulating unit 31, and a timing of displaying the message, "please remove documents before removing USB memory", on the display unit 15, may be replaced with each other. For example, S201 and S206 are replaced with each other, and S208 and S209 are replaced with each other.

(4) In the first embodiment of the invention, when determining that the document holder 12 is in the opened state (S105: YES), the CPU 103 regards the document 19 as being located on the reading surface 11A, and executes the FB remind-of-document process (S106). Other embodiments may be implemented. For example, two embodiments are conceived.

In the first one, the multi function device 1 includes a document detection sensor that is an optical sensor for detecting whether or not there is a document 19 on the reading surface 11A. When determining that there is a document 19 on the reading surface 11A, by the document detection sensor, the CPU 103 executes the FB remind-of-document process.

In the second one, when the user presses the start key 14B, if determining that there is any document 19 in the placing unit 21, by the placing unit document sensor 24, the CPU 103 executes the ADF remind-of-document process, and if determining that there is no document 19 in the placing unit 21, by the placing unit document sensor 24, the CPU 103 executes the FB remind-of-document process. With such embodiments, the invention is also applicable to a multi function device that does not include the above document detection sensor.

In the second embodiment of the invention, two modes are implemented which are: a mode A in which when the addition of access restriction is set to the image data of the document 19 read by the document reading unit 40 (S402: YES), the CPU 103 locks the USB memory 80 (S403); and a mode B in which when determining that the image data of the document 19 read by the document reading unit 40 includes a pattern of a mark indicating a confidential matter (S404: YES), the CPU 103 locks the USB memory 80 (S405). However, an embodiment may be implemented in which only the mode A or the mode B is implemented.

What is claimed is:

1. A reading device comprising:
   a reading unit configured to read a document;
   a placing unit configured to have a document to be read;
   a connection unit configured to be connected with a storage medium;
   a determination unit configured to determine whether or not the storage medium is connected to the connection unit;
   a judging unit configured to judge whether a document is on the placing unit; and
   an execution unit configured to start execution of a warning process when the judgment unit judges that there is the document to be read on the placing unit and the determination unit determines that the storage medium is connected to the connection unit and end the execution of the warning process when the document is removed from the placing unit before the document is read by the reading unit.

2. The reading device according to claim 1, further comprising a cover unit which covers a document and is brought into an opened state or closed state, wherein the judging is based upon whether the cover unit is in an opened state or a closed state, and the warning process is executed when the cover is judged to be in an open state.

3. The reading device according to claim 1, further comprising a display unit configured to perform a display for prompting removal of the document, wherein
   when the judging unit detects the presence of the document in the placing unit and the determination unit determines that the storage medium is connected to the connection unit, the execution unit is configured to execute, as the warning process, a process of visually advising by the display unit.

4. The reading device according to claim 1, further comprising a sound-output unit configured to output a sound for prompting removal of the document, wherein when a detection unit detects the presence of the document in an accumulating unit which has been printed and the determination unit is configured to determines that the storage medium connected to the connection unit is disconnected from the connection unit, the execution unit further configured to execute, as the warning process, a process of warning through a sound by the sound-output unit.

5. The reading device according to claim 1, wherein said execution unit is configured to end the execution of the warning process when the detecting unit does not detect the presence of a document on the accumulating unit once the sound is started.

6. A reading device comprising:

a reading unit configured to read a document;

a reading surface configured for placement of the document to be read;

a cover unit configured to move between a closed state in which the cover unit covers the reading surface and an opened state in which the cover unit does not cover the reading surface;

a detection unit configured to detect whether the cover unit is in the opened state or the closed state;

a connection unit configured to be connected with a storage medium;

a determination unit configured to determine whether or not the storage medium is connected to the connection unit; and an execution unit configured to start execution of a warning process when the determination unit determines that the storage medium is connected to the connection unit and the detection unit detects that the cover unit is in the opened state and end execution of the process when the detection unit detects that the cover unit is brought from the closed state into the opened state after the document is read by the reading unit.

7. A reading device comprising:

a reading unit configured to read a document;

a reading surface configured for placement of the document to be read;

a cover unit configured to move between a closed state in which the cover unit covers the reading surface and an opened state in which the cover unit does not cover the reading surface;

a detection unit configured to detect whether the cover unit is in the opened state or the closed state;

a connection unit configured to be connected with a storage medium;

a processor configured to control the reading device; and a memory configured to store machine readable instructions that, when executed by the processor, causes the reading device to:

start execution of a warning process when the processor determines that the storage medium is connected to the connection unit and the detection unit detects that the cover unit is in the opened state; and end execution of the warning process when the detection unit detects that the cover unit is brought from the closed state into the opened state after the document is read by the image reader.

* * * * *